United States Patent
Gao et al.

(10) Patent No.: US 11,223,231 B2
(45) Date of Patent: Jan. 11, 2022

(54) CHARGING SYSTEM AND CHARGING METHOD FOR AUTOMATIC FORCE DETECTION ROBOT FOR GAS PIPELINE

(71) Applicant: BEIJING GAS GROUP COMPANY LIMITED, Beijing (CN)

(72) Inventors: Shunli Gao, Beijing (CN); Xiaxi Li, Beijing (CN); Zandong Han, Beijing (CN); Jiabao Zhang, Beijing (CN); Linlin Xing, Beijing (CN); Qingyu Wang, Beijing (CN); Shengguo Li, Beijing (CN); Yao Liu, Beijing (CN); Rui Wu, Beijing (CN); Na Ni, Beijing (CN)

( * ) Notice: Subject to any disclaimer, the term of this patent is extended or adjusted under 35 U.S.C. 154(b) by 367 days.

(21) Appl. No.: 16/489,138

(22) PCT Filed: Mar. 12, 2019

(86) PCT No.: PCT/CN2019/077829
§ 371 (c)(1),
(2) Date: Aug. 27, 2019

(87) PCT Pub. No.: WO2019/179337
PCT Pub. Date: Sep. 26, 2019

(65) Prior Publication Data
US 2021/0359546 A1    Nov. 18, 2021

(30) Foreign Application Priority Data
Mar. 21, 2018   (CN) .......................... 201810233761.X

(51) Int. Cl.
*H01M 10/44* (2006.01)
*H01M 10/46* (2006.01)
(Continued)

(52) U.S. Cl.
CPC ............ *H02J 50/10* (2016.02); *H02J 7/0042* (2013.01); *H02J 7/0048* (2020.01); *H02J 50/70* (2016.02)

(58) Field of Classification Search
CPC ........ H02J 7/0042; H02J 7/0048; H02J 50/10; H02J 50/70; H02J 50/005
(Continued)

(56) References Cited

U.S. PATENT DOCUMENTS

2014/0375140 A1* 12/2014 Niizuma ................. B60L 53/12
                                                                   307/104
2015/0380157 A1* 12/2015 Green ................. H01F 27/2823
                                                                   307/104

FOREIGN PATENT DOCUMENTS

CN          107800197 A      3/2018
JP            6-261423 A      9/1994

* cited by examiner

*Primary Examiner* — Edward Tso
(74) *Attorney, Agent, or Firm* — Novoclaims Patent Services LLC; Mei Lin Wong

(57) ABSTRACT

The present disclosure relates to a charging system and a charging method for an automatic force detection robot for a gas pipeline. The charging system includes a primary charging unit disposed outside the gas pipeline and a secondary charging unit disposed in the gas pipeline, wherein the primary charging unit includes a primary magnetic core and a primary coil wound on the primary magnetic core, the secondary charging unit includes a secondary magnetic core and a secondary coil wound on the secondary magnetic core, the primary magnetic core and the secondary magnetic core form a closed magnetic field line, the primary coil is connected to a power supply, and the secondary coil is connected to a battery of the robot. The charging system has the advantages of simple structure, low cost, convenient use, strong anti-interference capability and high charging effi-
(Continued)

ciency, solves the problem that the cableless automatic force detection robot needs to overcome the shielding of the pipeline wall when charging, and improves the capability of the cableless automatic force detection robot when carrying out a long-distance detection in the pipeline. The charging method has the advantages of easy implementation, convenient operation, safety and reliability, and high charging efficiency.

9 Claims, 4 Drawing Sheets

(51) Int. Cl.
*H02J 50/10* (2016.01)
*H02J 50/70* (2016.01)
*H02J 7/00* (2006.01)

(58) Field of Classification Search
USPC ............... 320/104, 107, 108, 114, 115, 132; 307/104
See application file for complete search history.

CHARGING SYSTEM AND CHARGING METHOD FOR AUTOMATIC FORCE DETECTION ROBOT FOR GAS PIPELINE

CROSS-REFERENCE TO RELATED APPLICATIONS

This application is a continuation of international application No. PCT/CN2019/077829 filed on Mar. 12, 2019, which claims the benefit and priority of Chinese patent application No. CN201810233761X, filed Mar. 21, 2018, entitled "charging system and charging method for automatic force detection robot for gas pipeline". Both applications are incorporated herein in their entirety by reference.

TECHNICAL FIELD

The present disclosure relates to a charging device and, more particularly, to a charging system and a charging method for an automatic force detection robot for a gas pipeline.

BACKGROUND

With the adjustment of the national energy structure and the improvement of people's living standards, natural gas has become an important energy source for people's production and life, and has promoted the continuous expansion of the construction scale of city gas pipeline network. With the increase of service life, the probability of safety accidents caused by various defects in city gas pipelines is also increasing. At present, the monitoring of the state of the city gas pipelines in this field is limited to the outside of the pipelines, and there is no effective means for monitoring the inside of the pipelines. Based on people's increasing expectations for gas safety, it is urgent to research and develop technologies or equipment for internal detection of the city gas pipelines to detect defects such as pipeline corrosion, perforation, cracking, and the like, eliminate potential safety hazards in time, and ensure safe and stable operation of the gas pipelines.

Traditional long-distance oil and gas pipelines usually use a "pipeline pig" for in-pipeline detection. However, underground gas pipeline network in the city has the advantages of complex pipeline structure, different pipe diameters, various features and low operating pressure, therefore, the "pipeline pig" driven by differential pressure cannot meet the internal detection requirements of the underground gas pipelines in the city. For the underground gas pipeline network in the city, the most suitable method for the in-pipeline detection is to use a cableless automatic force detection robot with an adaptive underground pipeline structure, and to enable the robot to carry out close-in internal detection on the pipeline between the releasing and collecting devices by arranging a robot releasing and collecting device on the gas pipeline. However, the robot releasing and collecting device needs to dig up the ground and carry out an opening operation with gas on the gas pipeline, which is restricted by various factors such as operation risk and detection cost. Therefore, it is inappropriate to arrange too many robot releasing and collecting devices, and thus the automatic force detection robot is required to realize long-distance detection. However, the existing cableless automatic force detection robot is limited by the weight and capacity of the battery, and cannot meet the requirements of long-distance detection.

SUMMARY

The object of the present disclosure is to provide a charging system and a charging method for an automatic force detection robot for a gas pipeline. The charging system has the advantages of simple structure, low cost, convenient use, strong anti-interference capability and high charging efficiency, and solves the problem that the cableless automatic force detection robot needs to overcome the shielding of the pipeline wall when charging. The charging method has the advantages of easy implementation, convenient operation, safety and reliability, and high charging efficiency.

In order to solve the problem in the prior art that the cableless automatic force detection robot cannot realize a long-distance detection of the pipeline due to the limitation of battery power, the present disclosure provides a charging system for an automatic force detection robot for a gas pipeline, including a primary charging unit disposed outside the gas pipeline and a secondary charging unit disposed in the gas pipeline, wherein the primary charging unit includes a primary magnetic core and a primary coil wound on the primary magnetic core, the secondary charging unit includes a secondary magnetic core and a secondary coil wound on the secondary magnetic core, and the primary magnetic core and the secondary magnetic core form a closed magnetic field line, wherein the primary coil is connected to a power supply, and the secondary coil is connected to a battery of the robot.

Further, the primary magnetic core and the secondary magnetic core use a U-shaped structure, and two ends of the primary magnetic core and two ends of the secondary magnetic core are distributed one-to-one correspondingly on both sides of a gas pipeline wall.

Further, the charging system for an automatic force detection robot for a gas pipeline of the present disclosure further includes two magnetic saturation devices disposed outside the gas pipeline wall, wherein the two magnetic saturation devices are distributed at intervals in an axial direction of the gas pipeline, the magnetic saturation device includes an inner magnetic ring and an outer magnetic ring which are integrally connected at an upper end, and the two ends of the primary magnetic core are correspondingly disposed in the inner magnetic ring of the two magnetic saturation devices.

Further, the charging system for an automatic force detection robot for a gas pipeline of the present disclosure further includes a secondary magnetic core attitude control device, wherein the secondary magnetic core attitude control device includes a motor, a swing rod, a rotary potentiometer and a gravity hammer, the motor is installed in the robot, a lower end of the swing rod is fixedly connected to an output shaft of the motor, an upper end of the swing rod is fixedly connected to the secondary magnetic core, the rotary potentiometer is installed at the lower end of the swing rod, the gravity hammer is installed on a rotating shaft of the rotary potentiometer, wherein an axis of the output shaft of the motor and an axis of the rotating shaft of the rotary potentiometer coincide with an axis of the gas pipeline.

Further, a rectifying circuit and a waveform changing circuit are disposed between the primary coil and the power supply, and a voltage stabilizing circuit is disposed between the secondary coil and the battery of the robot.

Further, the charging system for an automatic force detection robot for a gas pipeline of the present disclosure further includes a positioning device disposed in a detection gate well of the gas pipeline, wherein the positioning device is used for positioning the robot.

The present disclosure provides a charging method for an automatic force detection robot for a gas pipeline by using the charging system, including the following steps:

S1. during a detection operation, making the robot to move to the nearest charging position when the robot needs to be charged;

S2. charging the secondary magnetic core by the secondary magnetic core attitude control device;

S3. arranging the primary charging unit and the magnetic saturation device at the charging position and adjusting positions thereof, so that the two ends of the primary magnetic core and the two ends of the secondary magnetic core correspond one to one on both sides of the gas pipeline wall;

S4. starting the charging system to charge the battery of the robot, stopping the charging system after charging is completed, and making the robot to continue the detection operation.

Further, in the step S1, whether the robot needs to be charged is determined by the following method: when remaining capacity of the battery makes the robot to move to the nearest charging position but is insufficient to the next charging position, determining that the robot needs to be charged, wherein the charging position is each detection gate well of the gas pipeline, and a positioning device for positioning the robot is disposed in the detection gate well.

Further, in the step S2, the charging the secondary magnetic core by the secondary magnetic core attitude control device is realized by the following method: detecting an output resistance of the rotary potentiometer, so that the motor adjusts an angle of the swing rod according to the output resistance of the rotary potentiometer, and the two ends of the secondary magnetic core are vertically upward.

Further, in the step S3, the two ends of the primary magnetic core and the two ends of the secondary magnetic core correspond one to one on both sides of the gas pipeline wall is realized by the following method: adjusting a position of the primary magnetic core in the axial direction of the gas pipeline, and detecting self inductance of the primary coil, wherein when the self inductance of the primary coil reaches the maximum, it is indicated that the two ends of the primary magnetic core and the two ends of the secondary magnetic core correspond one to one.

Compared with the prior art, the charging system and the charging method for an automatic force detection robot for a gas pipeline provided by the present disclosure have the following advantages: by the primary charging unit disposed outside the gas pipeline and the secondary charging unit disposed in the gas pipeline, the primary charging unit is provided with the primary magnetic core and the primary coil wound on the primary magnetic core, the secondary charging unit is provided with the secondary magnetic core and the secondary coil wound on the secondary magnetic core, and the primary magnetic core and the secondary magnetic core form the closed magnetic field line, wherein the primary coil is connected to a power supply, and the secondary coil is connected to the battery of the robot. Therefore, a charging system for an automatic force detection robot for a gas pipeline is constructed, which has the advantages of simple structure, low cost, convenient use, strong anti-interference capability and high charging efficiency. In practical applications, by forming the closed magnetic field line between the primary magnetic core and the secondary magnetic core, the energy of the primary charging unit of the charging system is efficiently coupled to the secondary charging unit, thereby realizing the purpose of charging the automatic force detection robot. The problem that the cableless automatic force detection robot needs to overcome the shielding of the pipeline wall when charging is solved, and the capability of the cableless automatic force detection robot when carrying out a long-distance detection of the pipeline is improved. In a preferred embodiment, both the primary magnetic core and the secondary magnetic core of the present disclosure use the U-shaped structure, so that the two ends of the primary magnetic core and the two ends of the secondary magnetic core are distributed one-to-one correspondingly on both sides of a gas pipeline wall; and the two magnetic saturation devices are disposed outside the gas pipeline wall, so that the two ends of the primary magnetic core are correspondingly disposed in the inner magnetic ring of the two magnetic saturation devices. The primary magnetic core and the secondary magnetic core having the U-shaped structure have advantages of simple structure and easy processing, and can reduce magnetic loss and improve charging efficiency. By arranging the magnetic saturation devices, the gas pipeline wall corresponding to the magnetic saturation devices can form an annular magnetic saturation region, and the gas pipeline wall at the center of the magnetic saturation region can maintain a high magnetic permeability, therefore, not only magnetic lines of the primary magnetic core can be prevented from being short-circuited through the gas pipeline wall, but also the magnetic lines of the primary magnetic core can pass through the gas pipeline wall corresponding to a high magnetic permeability region at the center of the magnetic saturation region and can be closed with the secondary magnetic core, thus energy transfer efficiency between the primary charging unit and the secondary charging unit is improved, and the utility is more practical. The charging method for an automatic force detection robot for a gas pipeline provided by the present disclosure has the advantages of easy implementation, convenient operation, safety and reliability, and high charging efficiency.

BRIEF DESCRIPTION OF THE DRAWINGS

To describe the technical solutions in the present disclosure more clearly, the following briefly describes the accompanying drawings required for describing the implementations.

DETAILED DESCRIPTION

Figure 1:
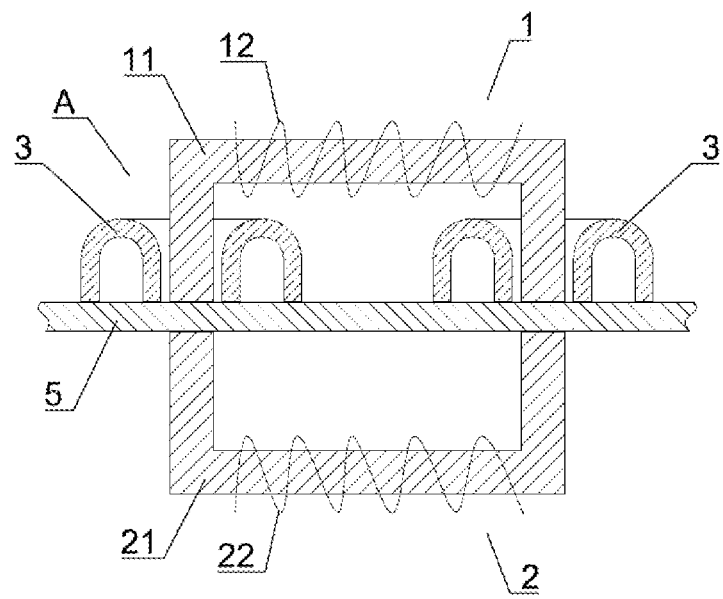
FIG. 1 is a schematic diagram of a charging system for an automatic force detection robot for a gas pipeline according to the present disclosure.
Figure 2:
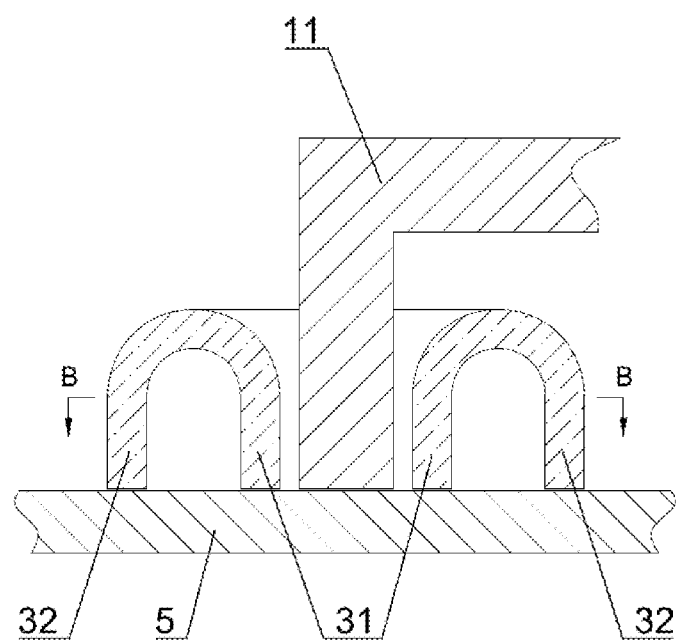
FIG. 2 is a partially enlarged schematic diagram of a position A in FIG. 1.
Figure 3:
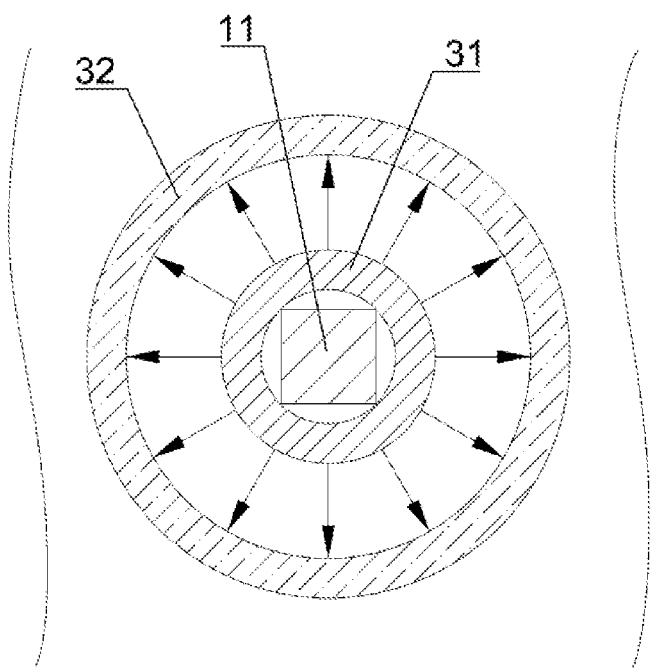
FIG. 3 is a view taken along line B-B in FIG. 2.
Figure 4:
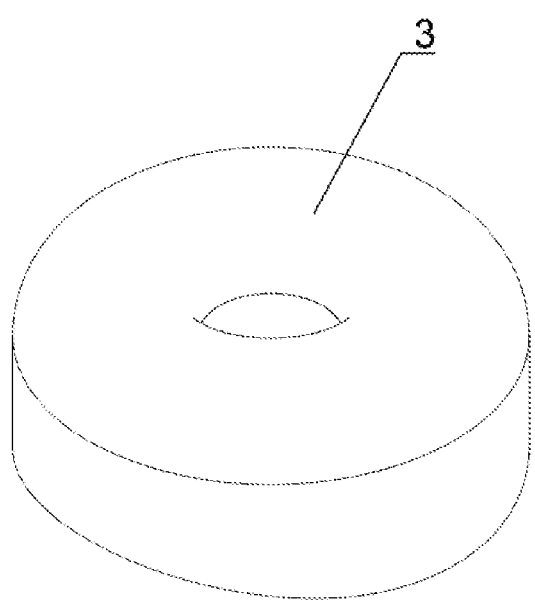
FIG. 4 is a schematic diagram of a magnetic saturation device according to the present disclosure.
Figure 5:
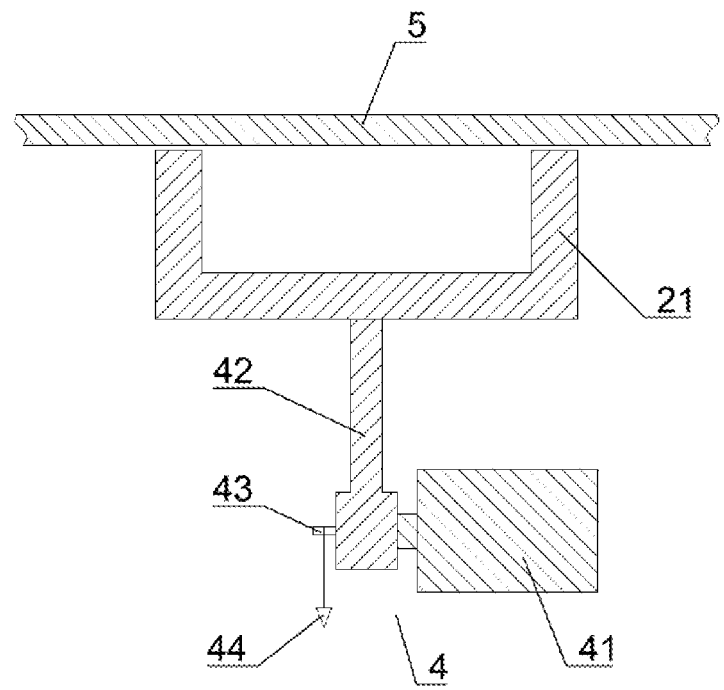
FIG. 5 is a schematic diagram of a secondary magnetic core attitude control device according to the present disclosure.
Figure 6:
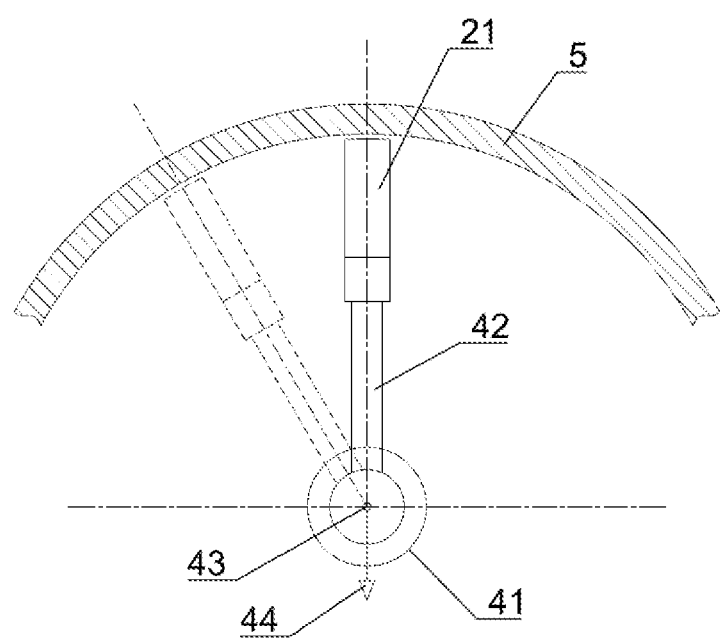
FIG. 6 is a left view of FIG. 5.

To make the technical objectives, technical solutions, and advantageous effects of the present disclosure clearer, the following describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

It should be noted that nouns of locality such as "on", "under", "left", "right", "before" and "after" in the embodiments of the present disclosure are only described according to the drawings, so as to facilitate understanding and not to limit the technical solutions of the present disclosure and the scope of the claimed protection. Unless specified or limited otherwise, terms "mounted", "connected", "coupled", "fixed", and the like are used broadly, and may be, for example, fixed connections, detachable connections, or integral connections; may also be mechanical or electrical connections; may also be direct connections or indirect connections via intervening structures; may also be inner communications of two elements, which can be understood by those skilled in the art according to specific situations.

As shown in FIGS. 1 to 7, a charging system for an automatic force detection robot for a gas pipeline in the embodiments of the present disclosure includes a primary charging unit 1 disposed outside the gas pipeline and a secondary charging unit 2 disposed in the gas pipeline. The primary charging unit 1 includes a primary magnetic core 11 and a primary coil 12 wound on the primary magnetic core 11. The secondary charging unit 2 includes a secondary magnetic core 21 and a secondary coil 22 wound on the secondary magnetic core 21. When charging, the primary magnetic core 11 and the secondary magnetic core 21 form a closed magnetic field line, the primary coil 12 is connected to a power supply, and the secondary coil 22 is connected to a battery of the robot. Through the above structure, the charging system for an automatic force detection robot for a gas pipeline with simple structure, low cost, convenient use, strong anti-interference capability and high charging efficiency is constructed. In practical applications, by forming the closed magnetic field line between the primary magnetic core 11 and the secondary magnetic core 21, the energy of the primary charging unit 1 is efficiently coupled to the secondary charging unit 2, thereby realizing the purpose of charging the automatic force detection robot. The problem that the cableless automatic force detection robot needs to overcome the shielding of the pipeline wall when charging is solved, and the capability of the cableless automatic force detection robot when carrying out a long-distance detection of the pipeline is improved. It should be noted that charging the automatic force detection robot refers to charging the battery of the automatic force detection robot, and both should be understood by the same concept.

In a preferred embodiment, the primary magnetic core 11 and the secondary magnetic core 21 in the embodiments of the present disclosure use the U-shaped structure, and the two ends of the primary magnetic core 11 and the two ends of the secondary magnetic core 21 are distributed one-to-one correspondingly on both sides of a gas pipeline wall 5, thereby simplifying the structure, reducing the processing difficulty, reducing the magnetic loss, and improving the charging efficiency. It should be noted that the primary magnetic core 11 and the secondary magnetic core 21 are not limited to the U-shaped structure, but may also use other equivalent or similar structural forms, so long as the primary magnetic core 11 and the secondary magnetic core 21 can form the closed magnetic field line. At the same time, the charging system in the embodiment of the present disclosure further includes two magnetic saturation devices 3. Each of the two magnetic saturation devices 3 specifically includes an inner magnetic ring 31 and an outer magnetic ring 32 which are integrally connected at an upper end. When charging, the two magnetic saturation devices 3 are disposed outside the gas pipeline wall and are distributed at intervals in an axial direction of the gas pipeline; and the two ends of the primary magnetic core 11 are correspondingly disposed in the inner magnetic ring 31 of the two magnetic saturation devices 3. By arranging the magnetic saturation devices 3, the gas pipeline wall corresponding to the magnetic saturation devices 3 can form an annular magnetic saturation region, and the gas pipeline wall at the center of the magnetic saturation region can maintain a high magnetic permeability, therefore, not only magnetic lines of the primary magnetic core 11 can be prevented from being short-circuited through the gas pipeline wall, but also the magnetic lines of the primary magnetic core 11 can pass through the gas pipeline wall corresponding to a high magnetic permeability region at the center of the magnetic saturation region and can be closed with the secondary magnetic core 21, thus the energy transfer efficiency between the primary charging unit 1 and the secondary charging unit 2 is improved, and the utility is more practical.

In a further preferred embodiment, the charging system in the embodiment of the present disclosure further includes a secondary magnetic core attitude control device 4. The secondary magnetic core attitude control device 4 specifically includes a motor 41, a swing rod 42, a rotary potentiometer 43 and a gravity hammer 44. The motor 41 is installed in the robot, a lower end of the swing rod 42 is fixedly connected to an output shaft of the motor 41, an upper end of the swing rod 42 is fixedly connected to the secondary magnetic core 21, the rotary potentiometer 43 is installed at the lower end of the swing rod 42, the gravity hammer 44 is installed on a rotating shaft of the rotary potentiometer 43, wherein an axis of the output shaft of the motor 41 and an axis of the rotating shaft of the rotary potentiometer 43 coincide with an axis of the gas pipeline. Since the automatic force detection robot has a central symmetrical structure, the posture thereof when moving in the gas pipeline is random, and thus it is impossible to ensure that the state of the secondary core 21 is always unchanged. When charging, in order to ensure that the secondary magnetic core 21 is aligned with the primary magnetic core 11, the secondary magnetic core attitude control device 4 is disposed to adjust the secondary magnetic core 21 to be in a vertical upward state. The specific process is as follows: when the secondary magnetic core 21 is vertically upward, the rotary potentiometer 43 outputs a resistance value R1. When the secondary magnetic core 21 is offset, the rotary potentiometer 43 outputs a resistance value R2 because the gravity hammer 44 is always downward. By detecting the resistance value R2 and comparing the resistance value R2 with the resistance value R1, the motor 41 can adjust the secondary magnetic core 21 to the vertical upward state according to the detection and comparison results, and thus effectively solving the problem of circumferential alignment between the secondary magnetic core 21 and the primary magnetic core 11 in the gas pipeline, and having the advantages of simple structure, easy control and convenient adjustment. The problem of the axial alignment between the secondary magnetic core 21 and the primary magnetic core 11 in the gas pipeline is realized by adjusting a position of the primary magnetic core 11 in the axial direction of the gas pipeline and detecting the self inductance of the primary coil 12; when the self inductance of the primary coil 12 reaches the maximum, it is indicated that the two ends of the primary magnetic core 11 and the two ends of the secondary magnetic core 21 correspond one to one on both sides of the gas pipeline wall, thereby realizing the alignment between the primary magnetic core 11 and the secondary magnetic core 21 in the axial direction of the gas pipeline.

Figure 7:
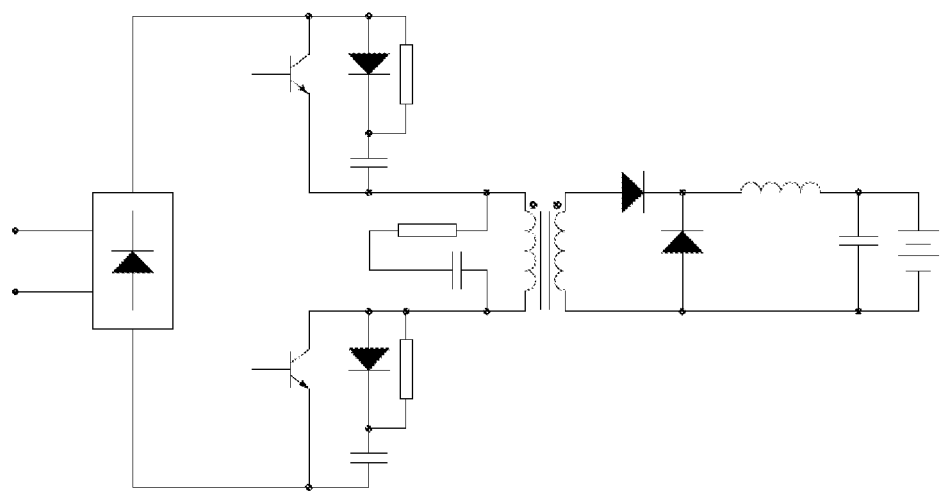
FIG. 7 is a circuit diagram of a charging system for an automatic force detection robot for a gas pipeline according to the present disclosure.

It should be noted that, in practical applications, the charging system for an automatic force detection robot for a gas pipeline of the present disclosure uses a single-ended forward inverter circuit to charge the battery of the automatic force detection robot, and the working principle thereof is as shown in FIG. 7. A rectifying circuit and a waveform converting circuit are disposed between the primary coil 12 and the power source, and a voltage stabilizing circuit is disposed between the secondary coil 22 and the battery of the robot. Alternating current is converted into direct current after being rectified, and is further converted into a pulse square wave of 333 Hz through a synchronous controllable high frequency switch of two power transistors T1 and T2, and then the energy of the primary coil 12 is transmitted to the secondary coil 22. The RCD network connected in parallel on T1 and T2 can reduce spike voltage and switching loss, and the R-C network connected in parallel with the primary coil 12 can be demagnetized in reverse to reduce the influence of remanence of the primary magnetic core and the secondary magnetic core. The pulse signal of the secondary coil 22 outputs a stable DC charging voltage through a voltage stabilizing circuit composed of D1, D2, L and C. For the city gas pipeline network, since the gas pipeline is underground, and thus the detection gate wells are disposed at intervals. In practical applications, a positioning device (the positioning device can use a Mark box, a positioning device used for long-distance oil and gas pipelines) is usually used in the detection gate wells of the gas pipeline, when charging is needed, the robot stops and charges after detecting the positioning device. This method can realize the purpose of charging the robot by using existing conditions and resources of the city gas pipeline network, without damaging the gas pipeline, thereby having higher safety and practicability.

Based on the same inventive concept, the present disclosure also provides a charging method for an automatic force detection robot for a gas pipeline by using the above charging system, which specifically includes the following steps:

S1. during a detection operation, making the robot to move to the nearest charging position when the robot needs to be charged;

S2. charging the secondary magnetic core 22 by the secondary magnetic core attitude control device 4;

S3. arranging the primary charging unit 1 and the magnetic saturation device 3 at the charging position and adjusting positions thereof, so that the two ends of the primary magnetic core 11 and the two ends of the secondary magnetic core 21 correspond one to one on both sides of the gas pipeline wall;

S4. starting the charging system to charge the battery of the robot, stopping the charging system after charging is completed, and making the robot to continue the detection operation.

In the step S1, whether the robot needs to be charged is determined by the following method: when remaining capacity of the battery makes the robot to move to the nearest charging position but is insufficient to the next charging position, determining that the robot needs to be charged, wherein the charging position is each detection gate well of the gas pipeline, and a positioning device for positioning the robot is disposed in the detection gate well.

In the step S2, the charging the secondary magnetic core 22 by the secondary magnetic core attitude control device 4 is realized by the following method: detecting an output resistance of the rotary potentiometer 43, so that the motor 41 adjusts an angle of the swing rod 42 according to the output resistance of the rotary potentiometer 43, and the two ends of the secondary magnetic core 21 are vertically upward.

In the step S3, the two ends of the primary magnetic core 11 and the two ends of the secondary magnetic core 21 correspond one to one on both sides of the gas pipeline wall is realized by the following method: adjusting a position of the primary magnetic core 11 in the axial direction of the gas pipeline and detecting self inductance of the primary coil 12, wherein when the self inductance of the primary coil 12 reaches the maximum, it is indicated that the two ends of the primary magnetic core 11 and the two ends of the secondary magnetic core 21 correspond one to one.

The charging method for an automatic force detection robot for a gas pipeline by using the above charging system provided by the present disclosure has the advantages of easy implementation, convenient operation, safety and reliability, and high charging efficiency.

The practical applications show that the charging system for an automatic force detection robot for a gas pipeline can bring the following beneficial effects: (1) the non-contact online charging of the robot is realized by the primary charging unit and the secondary charging unit. During the charging process, the robot is in the gas pipeline, the power supply is outside the pipeline (in general, the power supply is disposed in the gate well of the gas pipeline), the energy is coupled and transmitted through the gas pipeline wall, the pipeline will not be destroyed during the charging process; further, after the charging is completed, the robot can immediately detect the pipeline, and thus, the ability of the cableless automatic force detection robot for long distance detection is improved. (2) The charging efficiency is improved by the magnetic saturation device. The magnetic saturation device can make the gas pipeline wall corresponding to the magnetic saturation device form an annular magnetic saturation region, and make the gas pipeline wall at the center of the magnetic saturation region maintain a high magnetic permeability, and thus the magnetic lines of the primary magnetic core can be prevented from being short-circuited through the gas pipeline wall, and the magnetic lines of the primary magnetic core can be ensured to pass through the gas pipeline wall corresponding to a high magnetic permeability region at the center of the magnetic saturation region and to be closed with the secondary magnetic core, therefore, the magnetic leakage loss is reduced, and the energy transfer efficiency and the charging efficiency between the primary charging unit and the secondary charging unit are improved. (3) The primary magnetic core and the secondary magnetic core have high alignment accuracy and are easy to control. Through the gravity hammer and the rotary potentiometer, the alignment of the primary magnetic core and the secondary magnetic core in the circumferential direction of the gas pipeline can be realized; further, by detecting the self inductance of the primary coil, the alignment of the primary magnetic core and the secondary magnetic core in the axial direction of the gas pipeline can be realized, thereby having the advantages of simple method and easy control.

INDUSTRIAL APPLICABILITY

According to the charging system and the charging method for an automatic force detection robot for a gas pipeline provided by the present disclosure, by forming the closed magnetic field line between the primary magnetic core and the secondary magnetic core, the energy of the primary charging unit of the charging system is efficiently coupled to the secondary charging unit, so that the purpose of charging the automatic force detection robot is realized, the problem that the cableless automatic force detection robot needs to overcome the shielding of the pipeline wall when charging is solved, and the capability of the cableless automatic force detection robot when carrying out a long-distance detection of the pipeline is improved.

What is claimed is:

1. A charging system for an automatic force detection robot for a gas pipeline, comprising a primary charging unit (1) disposed outside the gas pipeline and a secondary charging unit (2) disposed in the gas pipeline, wherein the primary charging unit (1) comprises a primary magnetic core (11) and a primary coil (12) wound on the primary magnetic core (11), the secondary charging unit (2) comprises a secondary magnetic core (21) and a secondary coil (22) wound on the secondary magnetic core (21), and the primary magnetic core (11) and the secondary magnetic core (21) form a closed magnetic field line, wherein the primary coil (12) is connected to a power supply, and the secondary coil (22) is connected to a battery of the robot, the charging system further comprises a secondary magnetic core attitude control device (4), wherein the secondary magnetic core attitude control device (4) comprises a motor (41), a swing rod (42), a rotary potentiometer (43) and a gravity hammer (44), the motor (41) is installed in the robot, a lower end of the swing rod (42) is fixedly connected to an output shaft of the motor (41), an upper end of the swing rod (42) is fixedly connected to the secondary magnetic core (21), the rotary potentiometer (43) is installed at the lower end of the swing rod (42), the gravity hammer (44) is installed on a rotating shaft of the rotary potentiometer (43), wherein an axis of the output shaft of the motor (41) and an axis of the rotating shaft of the rotary potentiometer (43) coincide with an axis of the gas pipeline.

2. The charging system for an automatic force detection robot for a gas pipeline according to claim 1, wherein the primary magnetic core (11) and the secondary magnetic core (21) use a U-shaped structure, and two ends of the primary magnetic core (11) and two ends of the secondary magnetic core (21) are distributed one-to-one correspondingly on both sides of a gas pipeline wall.

3. The charging system for an automatic force detection robot for a gas pipeline according to claim 2, further comprising two magnetic saturation devices (3) disposed outside the gas pipeline wall, wherein the two magnetic saturation devices (3) are distributed at intervals in an axial direction of the gas pipeline, the magnetic saturation device (3) comprises an inner magnetic ring (31) and an outer magnetic ring (32) which are integrally connected at an upper end, and the two ends of the primary magnetic core (11) are correspondingly disposed in the inner magnetic ring (31) of the two magnetic saturation devices (3).

4. The charging system for an automatic force detection robot for a gas pipeline according to claim 3, wherein a rectifying circuit and a waveform changing circuit are disposed between the primary coil (12) and the power supply, and a voltage stabilizing circuit is disposed between the secondary coil (22) and the battery of the robot.

5. The charging system for an automatic force detection robot for a gas pipeline according to claim 4, further comprising a positioning device disposed in a detection gate well of the gas pipeline, wherein the positioning device is used for positioning the robot.

6. A charging method for an automatic force detection robot for a gas pipeline by using the charging system according to claim 4, comprising the following steps:
    S1. during a detection operation, making the robot to move to the nearest charging position when the robot needs to be charged;
    S2. charging the secondary magnetic core (22) by the secondary magnetic core attitude control device (4);
    S3. arranging the primary charging unit (1) and the magnetic saturation device (3) at the charging position and adjusting positions thereof, so that the two ends of the primary magnetic core (11) and the two ends of the secondary magnetic core (21) correspond one to one on both sides of the gas pipeline wall;
    S4. starting the charging system to charge the battery of the robot, stopping the charging system after charging is completed, and making the robot to continue the detection operation.

7. The charging method for an automatic force detection robot for a gas pipeline according to claim 6, wherein in the step S1, whether the robot needs to be charged is determined by the following method: when remaining capacity of the battery makes the robot to move to the nearest charging position but is insufficient to the next charging position, determining that the robot needs to be charged, wherein the charging position is each detection gate well of the gas pipeline, and a positioning device for positioning the robot is disposed in the detection gate well.

8. The charging method for an automatic force detection robot for a gas pipeline according to claim 6, wherein in the step S2, the charging the secondary magnetic core (22) by the secondary magnetic core attitude control device (4) is realized by the following method: detecting an output resistance of the rotary potentiometer (43), so that the motor (41) adjusts an angle of the swing rod (42) according to the output resistance of the rotary potentiometer (43), and the two ends of the secondary magnetic core (21) are vertically upward.

9. The charging method for an automatic force detection robot for a gas pipeline according to claim 6, wherein in the step S3, the two ends of the primary magnetic core (11) and the two ends of the secondary magnetic core (21) correspond one to one on both sides of the gas pipeline wall is realized by the following method:
    adjusting a position of the primary magnetic core (11) in the axial direction of the gas pipeline, and detecting self inductance of the primary coil (12), wherein when the self inductance of the primary coil (12) reaches the maximum, it is indicated that the two ends of the primary magnetic core (11) and the two ends of the secondary magnetic core (21) correspond one to one.

* * * * *